Dec. 11, 1951   J. H. THOMPSON   2,578,382
EQUIPMENT FOR USE IN HANDLING INVALIDS
Filed July 25, 1947   2 SHEETS—SHEET 2
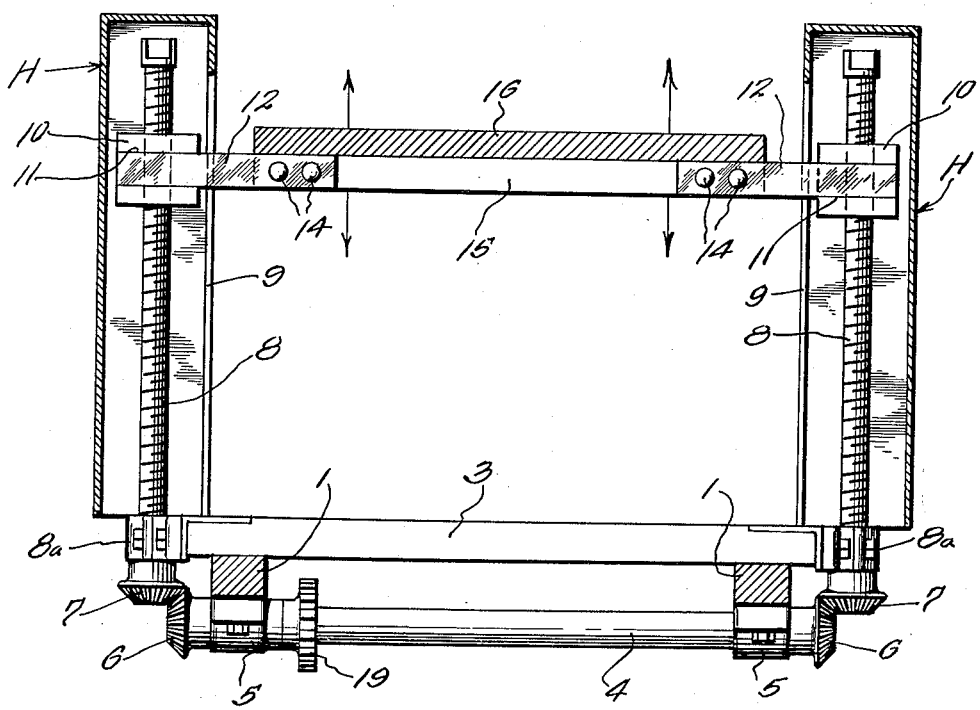
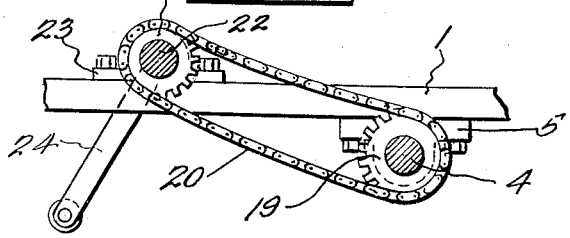
Inventor
J. H. Thompson
By Wilfred Lawson
Attorney Patented Dec. 11, 1951

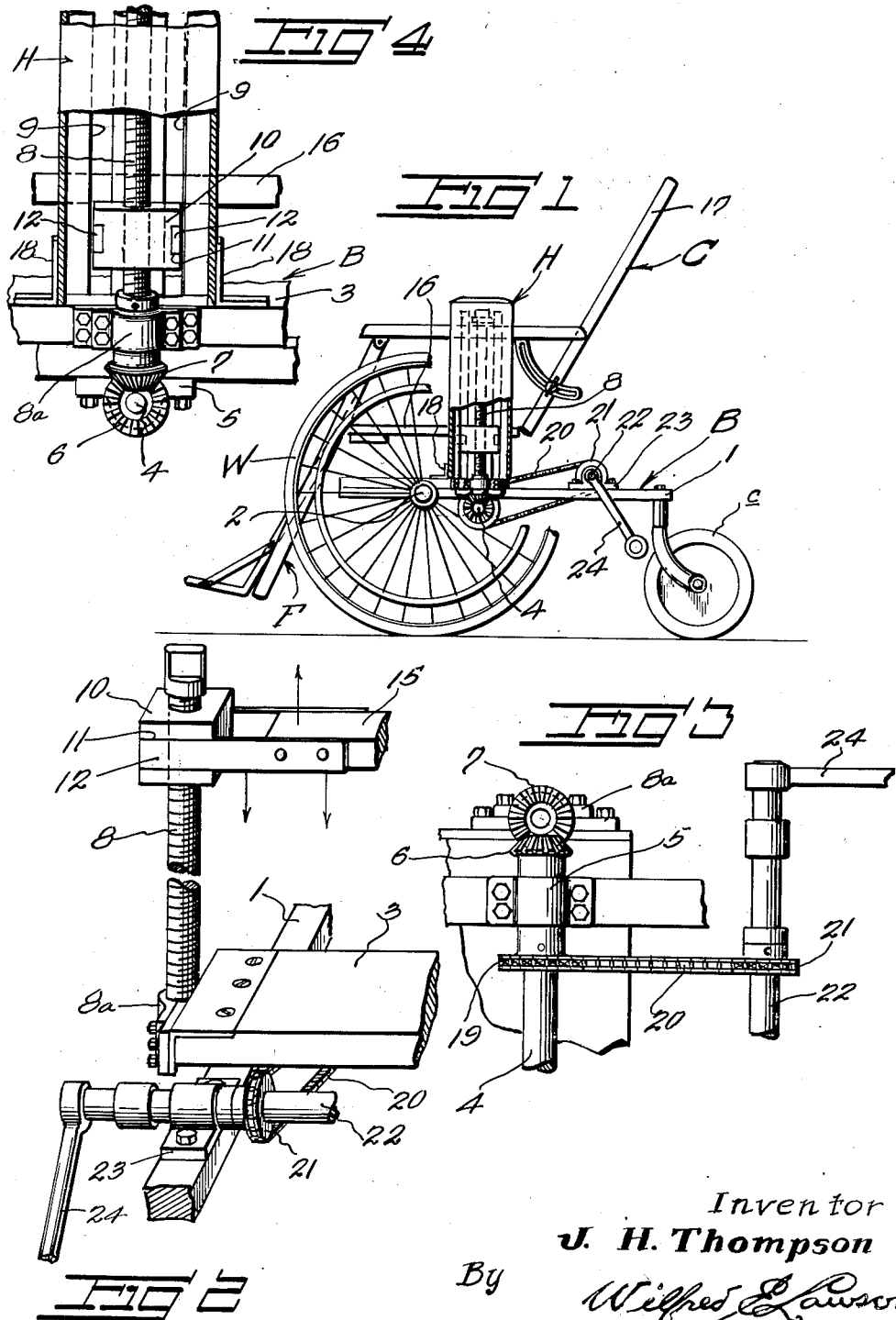

2,578,382

UNITED STATES PATENT OFFICE 2,578,382

EQUIPMENT FOR USE IN HANDLING INVALIDS

Joseph Henry Thompson, Gastonia, N. C.

Application July 25, 1947, Serial No. 763,662

1 Claim. (Cl. 155—30)

This invention relates to invalid equipment and it is an object of the invention to provide equipment of this kind which can be employed to advantage in the handling of invalids and particularly in the removal or placing of a patient with respect to a bed.

It is also an object of the invention to provide equipment of this kind which can be employed to advantage as a wheel chair.

The invention consists in the details of construction and in the combination and arrangement of the several parts of my improved equipment for use in handling invalids whereby certain advantages are attained, as will be hereinafter more fully set forth.

In order that my invention may be better understood, I will now proceed to describe the same with reference to the accompanying drawings, wherein:

Figure 1 is a view in side elevation of a piece of equipment constructed in accordance with an embodiment of the present invention;

Figure 2 is a fragmentary view in perspective on an enlarged scale of a portion of the operating mechanism as herein embodied;

Figure 3 is a fragmentary view in bottom plan of the structure as illustrated in Figure 2;

Figure 4 is a fragmentary view partly in section and partly in elevation of a portion of the lifting mechanism as herein comprised;

Figure 5 is an enlarged transverse vertical sectional view taken through the lift mechanism as herein embodied; and Figure 6 is a fragmentary view in side elevation of a part of the structure illustrated in Figure 3.

As illustrated in the accompanying drawings B denotes a base structure which is mounted for transit upon the main wheels W and the rear caster wheel c such as are generally employed in connection with chairs for invalids. This base structure comprises the side bars 1 which extend for a desired distance rearwardly of the supporting axle 2 for the wheels W and said bars 1 rearwardly of, but in relatively close proximity to the axle 2, are connected by the cross platform member 3 which is flat and relatively wide. Underlying the base structure B rearwardly of the axle 2 directly below the platform 3 is a shaft 4 rotatably mounted in the underhung bearings 5. The shaft 4 extends outwardly or beyond the members 1 and the extended ends have fixed thereto for rotation therewith the bevel pinions 6 which mesh with the bevel pinions 7 carried by the lower extremities of the vertically directed heavy duty screws 8. The lower portions of these screws 8 are rotatably held to the adjacent ends of the platform 3 by the holding bearings 8a which permit free rotation of screws 8, but effectively maintain the same against upward endwise movement. Downward movement of the screws 8 is prevented by the meshing of the gears 7 with the gears 6.

Each of the screws 8 extends upwardly within a housing H which is closed on all sides except the bottom, which is opened for communication with a slot 9 in the inner face of the housing.

Arranged within each of the housings H is a block 10 which readily moves up and down within the housing but is held by the side walls thereof against rotation. A screw 8 is threaded through each of these blocks so that upon rotation of the shaft 4 in the desired direction the blocks 10 will move upward or downward as may be desired.

Side faces of these blocks 10 are provided thereacross with the grooves or channels 11 in which are snugly received the inner end portions of the elongated flat bars 12 which are disposed a desired distance inwardly of the housing H and extend out through the slots 9. The members 12 are preferably metal as also are the blocks 10 and the connections therebetween may be made by welding or otherwise as may be preferred.

The inner portions of the members 12 overlie the side edges of an intermediate cross member 15 and are anchored thereto by the bolts 14 or otherwise as may be preferred.

Directly rested and mounted upon the member 15 is the seat 16 of a chair C of a type generally known as an invalid chair and which includes an adjustable back 17 and an adjustable foot structure F. The back 17 and the foot structure F may be readily brought into a position substantially coplanar with the seat 16 so that a patient in a supine position may be readily transported.

Each of the housings H is rigidly held to the base structure B by the brackets 18 or otherwise as may be preferred.

Fixed for rotation with the shaft 4 at a point preferably closely adjacent to one of the side members 1 but inwardly thereof is a sprocket wheel 19 around which passes a sprocket chain 20 which is also disposed around a sprocket 21 fixed for rotation with the shaft 22. This shaft 22 is rotatably supported by the suitable bearings 23 properly placed upon the side members 1 of the base B or otherwise as may be preferred, and an extended portion of the shaft 22 carries an operating handle 24 whereby the shaft 4 may be rotated as desired to effect the desired raising or lowering of the chair C.

It is believed to be readily apparent that when the parts of the chair C are in proper adjustment, a patient in a supine position, or in any other position, may be readily transported from or to a bed with minimum effort and with a minimum of discomfort to the patient.

From the foregoing description it is thought to be obvious that equipment consisting in accordance with my invention, for use in connection with invalids is particularly well adapted for use by reason of the convenience and facility with which it may be assembled and operated.

I claim:

An article of the character stated comprising a portable base structure, a fixed horizontal platform carried thereby, standing housings secured to the base platform at opposite sides thereof, heavy duty screws rotatably supported by the platform and extending upwardly into the housings, means for rotating the screws in unison, blocks fitted in the housings and threaded upon the screws, means holding the blocks against rotation in the housings, said housings being opposed in a direction transversely of the body, the opposed faces of the housings being provided upwardly therealong with slots, the second mentioned means including a cross member positioned intermediate the housings and operatively connected through the slots with the blocks within the housings, and a chair structure including a seat, the seat of such structure being mounted upon said cross member.

JOSEPH HENRY THOMPSON.

REFERENCES CITED

The following references are of record in the file of this patent:

UNITED STATES PATENTS

| Number | Name | Date |
|---|---|---|
| 462,022 | Bray | Feb. 2, 1892 |
| 652,021 | Ellenbecker | June 19, 1900 |
| 710,561 | Boyd | Oct. 7, 1902 |
| 1,527,754 | Simon | Feb. 24, 1925 |
| 2,445,158 | Sparhawk | July 13, 1948 |

FOREIGN PATENTS

| Number | Country | Date |
|---|---|---|
| 12,575 | Great Britain | 1901 |